(12) United States Patent
Wang et al.

(10) Patent No.: US 12,704,747 B2
(45) Date of Patent: Aug. 11, 2026

(54) METHOD AND DEVICE FOR OPTICAL POWER LIMITER

(71) Applicant: NATIONAL UNIVERSITY OF SINGAPORE, Singapore (SG)

(72) Inventors: Chao Wang, Singapore (SG); Gong Zhang, Singapore (SG); Ci Wen Lim, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 756 days.

(21) Appl. No.: 18/015,022

(22) PCT Filed: Jul. 9, 2021

(86) PCT No.: PCT/SG2021/050403
§ 371 (c)(1),
(2) Date: Jan. 6, 2023

(87) PCT Pub. No.: WO2022/010422
PCT Pub. Date: Jan. 13, 2022

(65) Prior Publication Data

US 2023/0258965 A1 Aug. 17, 2023

(30) Foreign Application Priority Data

Jul. 9, 2020 (SG) ............................ 10202006635S

(51) Int. Cl.
*G02F 1/01* (2006.01)
*H04B 10/291* (2013.01)

(52) U.S. Cl.
CPC ....... *G02F 1/0147* (2013.01); *H04B 10/2912* (2013.01)

(58) Field of Classification Search
CPC ...................................................... H04B 10/29
(Continued)

(56) References Cited

U.S. PATENT DOCUMENTS 5,491,579 A * 2/1996 Justus ................... G02F 1/0147 359/601
5,805,326 A * 9/1998 Snow .................... G02F 1/3551 359/885
(Continued)

FOREIGN PATENT DOCUMENTS

CA 2326980 A1 * 6/2001 ........... H01S 3/0602
CN 101493628 A 7/2009
(Continued)

OTHER PUBLICATIONS

Search Report issued in corresponding European Patent Application No. 21838644.9 on Jul. 8, 2024, consisting of 8 pp.
(Continued)

*Primary Examiner* — Kaveh C Kianni
(74) *Attorney, Agent, or Firm* — Volpe Koenig

(57) ABSTRACT

An optical power limiter, a method of fabricating the optical power limiter, a method of limiting optical power, a method of upper bounding information leakage in quantum cryptography, and a quantum cryptography system. The optical power limiter comprises an optical input port; an optical output port; an effective medium disposed between the input port and the output port; and a diaphragm disposed between the effective medium and the output port; wherein the effective medium has a thermo-optic coefficient such that a light beam entering the effective medium from the direction of the input port experiences a refractive index gradient in a direction perpendicular to a propagation direction in the effective medium as a result of absorption; and wherein the diaphragm is disposed in a path of the light beam for limiting how much of the light beam reaches the output port.

18 Claims, 6 Drawing Sheets

(58) Field of Classification Search
USPC .......................................................... 385/37
See application file for complete search history.

(56) References Cited

U.S. PATENT DOCUMENTS 5,900,983 A * 5/1999 Ford ...................... G02B 6/266 359/627
6,041,072 A * 3/2000 Ventrudo ........... G02B 6/02076 372/75
6,415,075 B1 * 7/2002 DeRosa ................. G02B 6/264 385/98
6,583,873 B1 * 6/2003 Goncharov ............... G01J 3/44 356/331
6,628,863 B2 * 9/2003 Jang ................... G02B 6/02095 385/37
6,652,778 B1 * 11/2003 Twarowski ........... G02F 1/0147 252/582
6,738,203 B2 * 5/2004 Ando .................... G02F 1/3523 359/359
6,819,815 B1 * 11/2004 Corbalis .............. G02B 6/3588 385/16
7,196,794 B2 * 3/2007 Wu ......................... A61F 9/022 356/370
8,094,982 B2 * 1/2012 Wu .......................... G02B 6/32 385/33
8,488,245 B1 * 7/2013 Chann ................... H01S 5/4031 353/34
2002/0106149 A1 * 8/2002 Tehrani .............. G02B 6/29398 385/27
2003/0213787 A1 * 11/2003 Dunsky .............. B23K 26/0734 219/121.75
2004/0033045 A1 * 2/2004 Oto ....................... G02F 1/3511 385/140
2004/0125374 A1 * 7/2004 Berger ...................... G01J 3/18 356/364
2011/0170159 A1 * 7/2011 Donval ..................... E06B 9/24 359/241
2014/0010250 A1 * 1/2014 Gao ........................ H01S 3/106 372/20
2014/0218795 A1 * 8/2014 Scerbak .................. G02F 1/093 359/484.04
2014/0314107 A1 * 10/2014 Gao ...................... H01S 5/4062 372/20
2015/0202083 A1 * 7/2015 Takeda .................... A61F 9/008 606/4
2015/0293301 A1 * 10/2015 Huang ................. G02B 6/4215 385/14

FOREIGN PATENT DOCUMENTS

CN 115313128 B * 4/2024 ........... H01S 3/0007
EP 1327905 A1 7/2003
JP 2005265986 A * 9/2005 ......... H04Q 11/0005
JP WO2004099854 A1 * 7/2006 ........... G02B 6/2938
SU 1013749 A1 * 4/1983

OTHER PUBLICATIONS

Fiber-optic Power Limiter Based on Photothermal Defocusing in an Optical Polymer. https://www.researchgate.net/publication/10734056_Fiber-Optic_Power_Limiter_Based_on_Photothermal_Defocusing_in_an_Optical_Polymer.

Low-threshold Optical limiting and Nonlinear refraction in Nanocomposite films of Light Green dye-polymer system https://iopscience.iop.org/article/10.1088/1757-899X/73/1/012116.

Ultra low threshold optical power limiter based on a silicon photonic crystal cavity. https://ieeexplore.ieee.org/document/7375966.

Thermal nonlinear refraction properties of Ag2S semiconductor nanocrystals with its application as a low power optical limiter. https://www.sciencedirect.com/science/article/abs/pii/S0030401811000320.

Low-threshold optical power limiting of cw laser illumination based on nonlinear refraction in zinc tetraphenyl porphyrin. https://www.sciencedirect.com/science/article/abs/pii/S0030399204002439.

Zhang, G. et al. Securing Practical Quantum Communication Systems with Optical Power Limiters. PRX Quantum, Jul. 7, 2021, vol. 2, No. 3, p. 030304 [Retrieved on Sep. 24, 2021], DI: 10.1103/PRXQUANTUM.2.030304> Whole document.

Securing Practical Quantum Cryptography with Optical Power Limiters, Sep. 27, 2020 [Retrieved on Sep. 24, 2021 from https://web.archive.org/web/20200927000758/https:/2020.qcrypt.net/flides/QCrypt2020TalkSlides056Zhang-2.pdf] Whole document, especially pp. 708 and 16-18.

* cited by examiner

METHOD AND DEVICE FOR OPTICAL POWER LIMITER

FIELD OF INVENTION

The present invention relates broadly to an optical power limiter, a method of fabricating a optical power limiter, a method of limiting optical power, a method of upper bounding information leakage in quantum cryptography, and a quantum cryptography system.

BACKGROUND

Any mention and/or discussion of prior art throughout the specification should not be considered, in any way, as an admission that this prior art is well known or forms part of common general knowledge in the field.

Optical power limiters are used in a number of applications, including for protecting optical components in optical communication and sensing systems, limiting eavesdropper's information in quantum cryptography applications, etc.

As will be appreciated by a person skilled in the art, it only requires about 100 mW of optical power to cause permanent damage to commercial optical equipment, including photodetectors, modulators and amplifiers etc. Similar to an electric fuse in an electric network, a power limiter protects the optical network from damage due to power spikes and surges. Also, it increases the reliability of an optical system, since a damaged power limiter is easier to repair and replace than a damaged optical equipment.

Moreover, power limiters have proven to be important in quantum cryptography systems. Given that most implementations of quantum cryptography systems require low light operations for security reasons, limiting the energy of incoming and outgoing optical signals is a central task. Taking quantum key distribution (QKD) for example, the transmitter which carries key encoding information may be susceptible to Trojan horse attacks (THA) if there are no power limiting devices in place. More specifically, an eavesdropper may inject a strong light pulse into the transmitter and collect a certain fraction of the reflected signal which now contains the modulation information of the transmitter. Such an attack clearly threatens the security of QKD since it cannot be detected. On the other hand, the amount of information leakage via THA has a positive relationship with the intensity of the incoming and reflected coherent light from the transmitter. Thus, by limiting the input light power, a power limiter can upper bound the amount of leaked information. In addition to restricting the efficacy of THA, limiting the input/output optical power is also of great importance for other quantum cryptography protocols such as the semi-device-independent protocols which assume the energy of the underlying quantum system is bounded.

To practically bound the optical power, both active monitoring and physical mechanism based on laser-induced damage threshold have been deployed in quantum systems. However, these measures may not provide security against monitoring-related attacks, or may not be suitable for two-way communication protocols such as the plug-and-play configuration.

Considering the importance of such power limiting devices in optical networks and quantum cryptography systems, there is a need for a passive, reusable and cost effective solution. The device should work for both continuous-wave and pulsed input laser. Simple structure and replaceability of such devices are also desirable.

In one proposed design [Fiber-optical power limiter based on liquid core optical fiber (IEEE Photonics Technology Letters 24, 297-299, (2011))], the power limiting effect in a liquid-core optical fiber (LCOF) has been proposed, where the absorption of evanescent field in the thin absorption layer deposited on the LCOF cladding will cause heat accumulation, which increases the temperature of the fiber. Since the thermal-optical coefficients of the core and cladding experience differential heating, it decreases the transmission efficiency of the light propagating in the fiber core, and limits the final output power. However, liquid-core optical fibers are not readily/commercially available and will incur a large manufacturing cost.

In another proposed design [Fiber-optical power limiter based on optical adhesive (Applied Optics 40, 6611 (2001))], the output power limiting is achieved by utilizing the thermal-optical effect of the optical adhesive connecting two fiber collimators. However, connection of two fiber collimators with optical adhesive is a technically demanding endeavor, which involves consistent UV curing of the adhesive at every point, precise calibration of the collimators caused by adhesive shrinkage, etc.

In another proposed design [Optical power limiter based on photonic chip micro-ring resonator (Scientific Reports 4, 6676, (2014))], the chip-based micro-ring resonator has a specific working frequency. When the absorption of the input light increases the temperature of the ring resonator, its working wavelength will shift and therefore attenuate the input light. Therefore, the power limiting effect applies only on a specific working wavelength of the input signal, and has limited power limitation on the output power.

Embodiments of the present invention seek to address at least one of the above problems.

SUMMARY

In accordance with a first aspect of the present invention, there is provided an optical power limiter comprising:

an optical input port;
an optical output port;
an effective medium disposed between the input port and the output port; and
a diaphragm disposed between the effective medium and the output port;
wherein the effective medium has a thermo-optic coefficient such that a light beam entering the effective medium from the input port experiences a refractive index gradient in a direction perpendicular to a propagation direction in the effective medium as a result of absorption; and
wherein the diaphragm is disposed in a path of the light beam for limiting how much of the light beam reaches the output port.

In accordance with a second aspect of the present invention, there is provided a method of fabricating the optical power limiter comprising the steps of:

providing an optical input port;
providing an optical output port;
disposing an effective medium between the input port and the output port; and
disposing a diaphragm between the effective medium and the output port;
wherein the effective medium has a thermo-optic coefficient such that a light beam entering the effective medium from the direction of the input port experiences a refractive index gradient in a direction perpendicular to a propagation direction in the effective medium as a result of absorption; and wherein the diaphragm is disposed in a path of the light beam for limiting how much of the light beam reaches the output port.

In accordance with a third aspect of the present invention, there is provided a method of limiting optical power comprising the steps of:

directing a light beam into an effective medium disposed via an input port;

subjecting the light beam to a refractive index gradient in the effective medium in a direction perpendicular to a propagation direction in the effective medium as a result of absorption; and limiting how much of the light beam reaches an output port along the propagation direction.

In accordance with a fourth aspect of the present invention, there is provided a method of upper bounding information leakage in quantum cryptography using the optical power limiter of the first aspect and/or the method of the third aspect.

In accordance with a fifth aspect of the present invention, there is provided a quantum cryptography system comprising the optical power limiter of the first aspect configured for upper bounding information leakage.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a method and design for a reusable optical power limiting device with an upper threshold on the output optical power. In example embodiments, the maximum output optical power of the device can be modeled by optical defocusing effect, which is determined by the parameters of the optical medium. Specifically, embodiments of the present invention can limit the average power of both continuous-wave and pulsed light. There are several advantages that can be provided by embodiments of the present invention:

1. Customizable power limiting threshold: By tuning the parameters of example embodiments, a customizable output power threshold of around mW or lower can be achieved.

2. Robust performance: The efficacy of example embodiments relies only on the temperature gradient within the optical medium, which is mainly determined by input light energy and has negligible dependence on other degrees-of-freedom. Hence, devices according to example embodiments are highly robust against environmental changes, particularly assuming that the surface temperature can be well controlled as the power limiter according to an example embodiment is located in a trusted device (transmitter).

3. Compact and cost-effective design: Composing of only off-the-shelf optical components and having a simple structure, example embodiments possess the advantage of compact size, simple assembling, cost-effectiveness, etc.

Embodiments of the present invention described herein provide a method and design for a passive optical power limiter based on the thermo-optical defocusing effect, and particularly the application in securing quantum cryptographic applications. By modeling the example embodiments, it is shown that a customizable power limiting in the regime of ~mW or lower can be achieved. The design according to example embodiments comprises of only off-the-shelf components and has a simple architecture, which possesses desirable features like compactness, robustness, polarization and spectrum dimension independence, etc.

Figure 1:
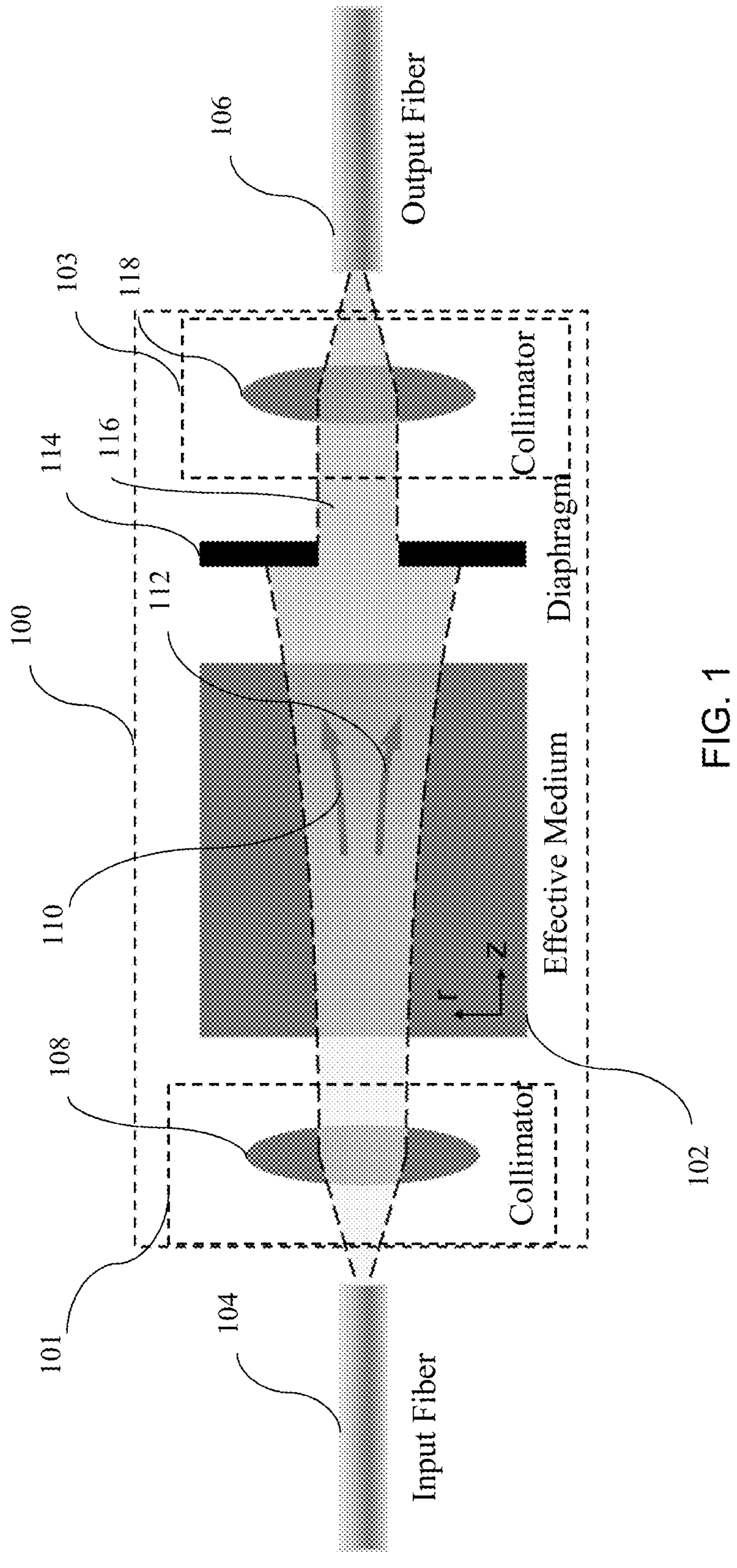
FIG. 1 shows a schematic of a power limiter system according to an example embodiment.

A schematic of a power limiter system 100 according to an example embodiment is shown in FIG. 1, where an effective medium 102 with negative thermo-optic coefficient is used to connect the input and output ports 101, 103 of the power limiter 100, which are in turn coupled to respective input and output fibers 104, 106. It is noted that in different embodiments, the power limiter can be applied to free space, or optical waveguides input/output. After the light has been injected into the effective medium 102, here via collimator 108, the absorption of input light in the effective medium 102 creates a heat gradient perpendicular, here radially, to the propagation direction z, which is then converted to a refractive index gradient that in turn diverges the input laser light, here radially, as indicated by arrows 110, 112 in FIG. 1. It is noted that a collimator may not be used where the power limiter according to example embodiments is applied to free space, i.e. without the need to interface to an external waveguide. By adding a tunable diaphragm 114, the amount of output power can be suitably controlled as will be described in more detail next. It is noted that the present invention is not limited to single tuning or ongoing tunability. For example, for a very specific use in specific conditions, the power limiter may only need to be tuned once in the manufacturing process. On the other hand, for use in different systems/conditions, a continuous tunability function can also be added in example embodiments. Also, the power limiter can be tuned physically and/or electronically in example embodiment. The un-blocked portion 116 of the diverging beam is coupled into the output fiber 106, here via collimator 118.

It is noted that in another example embodiment, by placing a second diaphragm on the other side of the effective medium, the power limiter can operate bi-directionally. In one such embodiment, no other additional element(s) are required for bi-directional operation.

Analytically, the laser intensity at position (r, z) in the effective medium 102 can be expressed as $$I(r,z)=I(r,0)\cdot\exp\left(-\alpha z+\frac{\frac{\partial n}{\partial T}Pe^{-r^2/a^3}\left(z-\frac{1-e^{-\alpha z}}{\alpha}\right)}{\pi kna^2}\right), \tag{1}$$

where the input intensity I(r, 0) is assumed to be Gaussian, a is the beam width, a is the absorption coefficient of the prism, n is the refractive index, T is the temperature, P is the incident laser power, and k is the thermal conductivity. The model in Eq (1) neglects the temperature gradient in the z-direction as well as the radiative and convective heat transfer. It also assumes that the beam shape is well approximated by a Gaussian profile when the input power is not too high.

It is noted that Eq(1) is a steady state model. If one considers average power and average intensity\heat distribution for pulsed light, Eq(1) can equally apply for pulsed light.

Figures 2A, 2B:
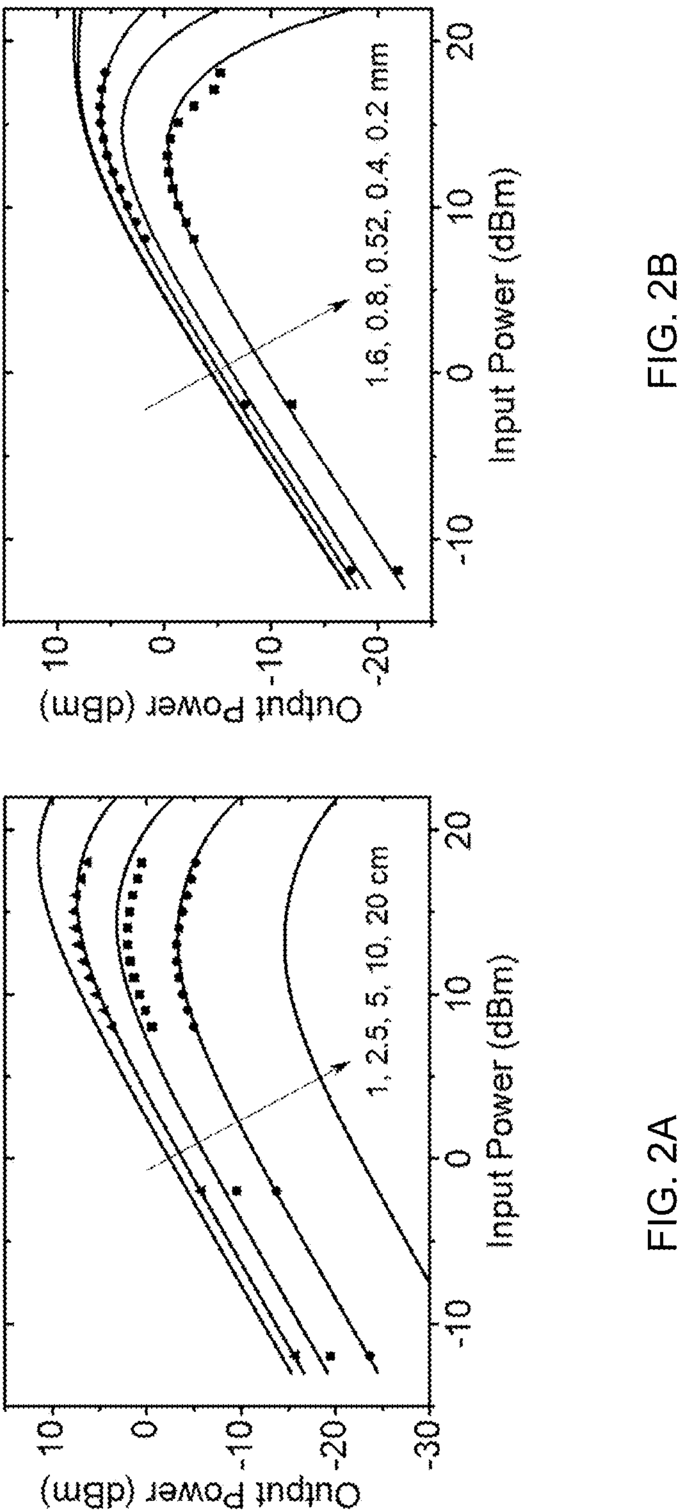
FIG. 2A shows the simulated output-input power relationship at different effective medium lengths from 1 cm to 20 cm with the same diaphragm width and at the same position relative to the effective medium, and the experimental data points are the results from the considered cases, at a wavelength of 1550 nm, continuous wave, according to example embodiments.
FIG. 2B shows the simulated output-input power relationship analysis of the effect of diaphragm width and at the same position relative to the effective medium and the experimental data points are the results from the considered cases, at a wavelength of 1550 nm, continuous wave, according to example embodiments.

To control the limiting power threshold, the effects owing to the effective medium 102 length and diaphragm 114 width are analyzed using Eq (1). FIG. 2A shows the simulated output-input power relationship at different effective medium lengths from 1 cm to 20 cm with the same diaphragm width and at the same position relative to the effective medium, and the experimental data points obtained from measurements of example embodiments for some of the effective medium lengths. The result clearly shows that a limited output power at about 10 to 15 dBm input power is achieved, and the simulation results in the curves in FIG. 2A accurately match the experimental results. A similar analysis of the effect of diaphragm width and at the same position relative to the effective medium is shown in FIG. 2B. The date shown in FIG. 2A and FIG. 2B was obtained at a wavelength of 1550 nm, continuous wave, as a non-limiting example. Similar effects are applicable for different wavelengths, i.e. the invention is not limited to a particular wavelength.

Figure 6:
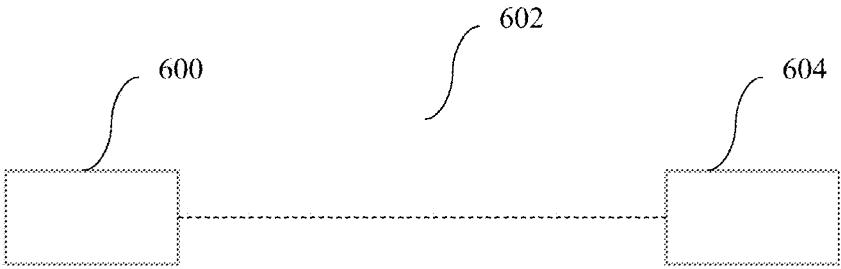
FIG. 6 shows a schematic diagram illustrating an example embodiment applied to a QKD system.

With the above modeling and experiment verification, it is shown that embodiments of the present invention can provide an effective way for limiting the outgoing optical energy from a device, for example a QKD transmitter 600 in a QKD system 602 schematically shown in FIG. 6, and similarly the incoming optical energy into a device, for example a QKD receiver 604 in the QKD system 602 schematically shown in FIG. 6, which is important for many applications, for example in practical quantum cryptographic systems/protocols.

Suitable materials for the effective medium for use in example embodiments include, but are not limited to, most known polymers, which have a negative thermo-optic coefficient due to strong thermal expansion, including, but not limited to, Poly(methyl methacrylate) (PMMA), epoxy, sol-gel with diphenylsilane, silicone, Poly(methyl methacrylate) (PEMA), Polyetheretherketone (PEEK), Polycarbonate, Polystyrene, sol-gel, Urethane acrylate elastomer, Polyimide, Polyurethane, etc.

As another non-limiting example, some nonlinear crystals and ionic materials with low melting point have high thermal expansion and negative thermo-optic coefficient, including, but not limited to, ammonium dihydrogen phosphate (ADP), potassium dihydrogen phosphate, (KDP), and their isomorphs, barium beta-borate (BBO), deuterated L-arginine phosphate (D-LAP), KNO, $LiB_3O_5$, $LiIO_3$, $Ti_3AsSe_3$, Bismuth germanate (BGO), $CaWO_4$, CaMoat, $PbMoO_4$, AgCl, $BaF_2$, $CaF_2$, $CdF_2$, CsBr, CsI, KBr, KCl, KI, LiF, NaCl, NaF, TiBr, $SrF_2$, PbS, PbSe, PbTe.

It is noted that the power limiter according to example embodiments, such as the power limiter 100 shown in FIG. 1, uses only off-the-shelf components. The beam width is typically on the order of a few hundred micrometers. As will be appreciated by a person skilled in the art, current mechanical machining can easily achieve 1 μm accuracy. As insertion loss is not a critical concern according to example embodiments, the 1 μm accuracy is sufficient according to example embodiments.

For example, the diaphragm for use in example embodiments can be a tunable iris or interchangeable diaphragm, both of which are commonly used in optic systems.

Figures 3A, 3B:
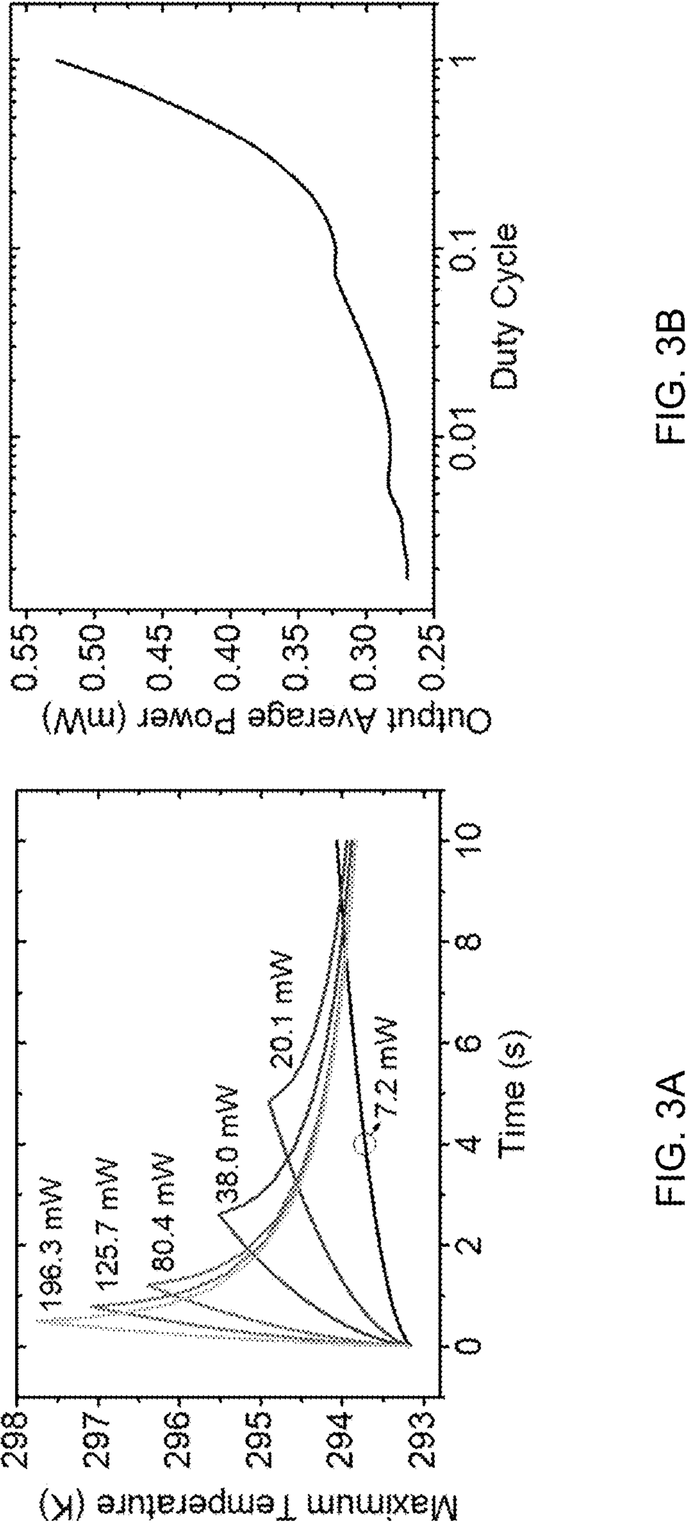
FIG. 3A shows calculated average output power of a power limiter according to an example embodiment considering a constant-energy pulse input with varying input power, using COMSOL.
FIG. 3B shows the calculated average output power as a function of duty cycle for an average input power of 20~mW, according to an example embodiment.

To compare the pulse result with the continuous-wave result according to various example embodiments, the average output power of a power limiter according to an example embodiment was calculated considering a constant-energy pulse input using COMSOL. As shown in FIG. 3A, the temperature simulation result shows that the higher the input power, the faster the temperature rises. Even with the same amount of input energy, higher input power would lead to a higher maximum temperature. As a result, a higher refractive index gradient and larger divergence of input laser are expected according to example embodiments. Considering, as a non-limiting example, an average input power of 20~mW, the average output power as a function of duty cycle is shown in FIG. 3B. Under the same energy condition, pulsed input experiences greater power-limiting effect compared to the continuous-wave cases, according to various example embodiments.

The thermo-optic coefficient, TOC, can be modeled by $$TOC=\frac{dn}{dT}=\frac{(n^2-1)(n^2+2)}{6n}(\Phi-\beta), \tag{2}$$

where T is the temperature, n is the refractive index, Θ is the electronic polarizability, and β is the volumetric expansion coefficient. For polymer, as a non-limiting example, the thermo-optic coefficient is dominated by density changes caused by thermal expansion, which is independent of the optical properties. For example, the TOC for PMMA reported in a previous works varies from $-1.30\times10^4\ K^{-1}$ to $-1.37\times10^4\ K^{-1}$ within the range of 472 nm to 1550 nm wavelength [G. Beadie, Appl. Opt. 54, F139-F143 (2015); Zhang, Zhiyi, et al. Polymer 47.14, 4893-4896 (2006)]. As a result, the effect of optical defocusing is pre-dominantly related to the absorption spectrum of the effective medium, which is also easily tunable, e.g. by doping, based on different application requirements, according to various example embodiments.

In one embodiment, an optical power limiter is provided comprising an optical input port; an optical output port; an effective medium disposed between the input port and the output port; and a diaphragm disposed between the effective medium and the output port; wherein the effective medium has a thermo-optic coefficient such that a light beam entering the effective medium from the direction of the input port experiences a refractive index gradient in a direction perpendicular to a propagation direction in the effective medium as a result of absorption; and wherein the diaphragm is disposed in a path of the light beam for limiting how much of the light beam reaches the output port.

The diaphragm may be tunable for adjusting a limit of how much of the light beam reaches the output port.

The effective medium may have a negative thermo-optic coefficient for diverging the light beam as a result of the refractive index gradient.

The input port may comprise a collimator for forming the light beam from an input light signal.

The input port may be configured for coupling to free space, to an input fiber, or to an input waveguide.

The output port may comprise a collimator for focusing the light beam after the diaphragm.

The output port may be configured for coupling to free space, to an output fiber, or to an output waveguide.

Figure 4:
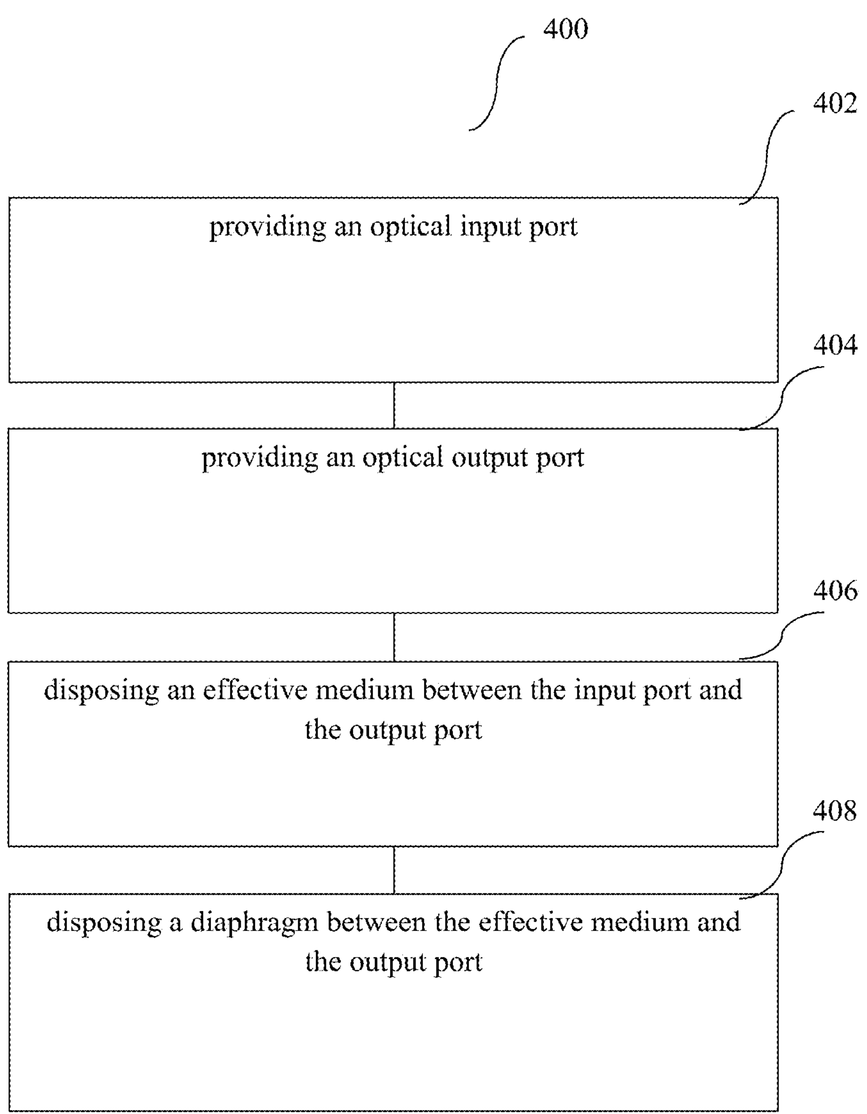
FIG. 4 shows a flow-chart illustrating a method of fabricating the optical power limiter, according to an example embodiment.

FIG. 4 shows a flow-chart 400 illustrating a method of fabricating the optical power limiter, according to an example embodiment. At step 402, an optical input port is provided. At step 404, an optical output port is provided. At step 406, an effective medium is disposed between the input port and the output port. At step 408, a diaphragm is disposed between the effective medium and the output port; wherein the effective medium has a thermo-optic coefficient such that a light beam entering the effective medium from the direction of the input port experiences a refractive index gradient in a direction perpendicular to a propagation direction in the effective medium as a result of absorption; and wherein the diaphragm is disposed in a path of the light beam for limiting how much of the light beam reaches the output port.

The method may comprise tuning the diaphragm for adjusting a limit of how much of the light beam reaches the output port.

The effective medium may have a negative thermo-optic coefficient for diverging the light beam as a result of the refractive index gradient.

Providing the input port may comprise providing a collimator for forming the light beam from an input light signal.

The method may comprise configuring the input port for coupling to free space, to an input fiber, or to an input waveguide.

Providing the output port may comprise providing a collimator for focusing the light beam after the diaphragm.

The method may comprise configuring the output port for coupling to free space, to an output fiber, or to an output waveguide.

Figure 5:
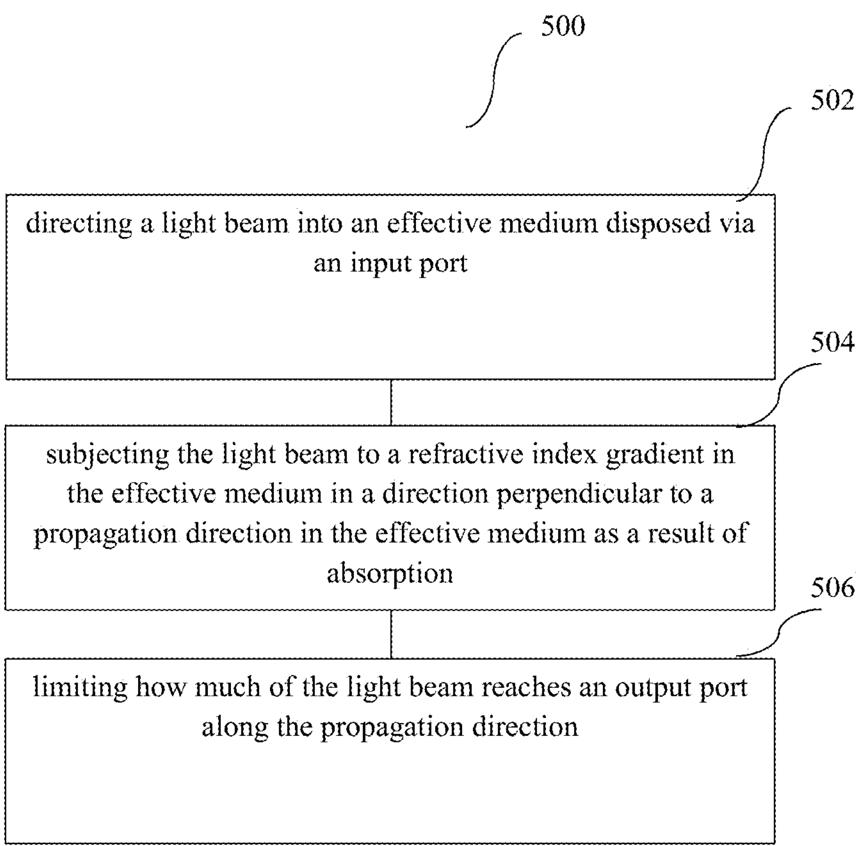
FIG. 5 shows a flowchart illustrating a method of limiting optical power, according to an example embodiment.

FIG. 5 shows a flowchart 500 illustrating a method of limiting optical power, according to an example embodiment. At step 502, a light beam is directed into an effective medium disposed via an input port. At step 504, the light beam is subjected to a refractive index gradient in the effective medium in a direction perpendicular to a propagation direction in the effective medium as a result of absorption. At step 506, how much of the light beam reaches an output port along the propagation direction is limited.

The method of may comprise adjusting a limit of how much of the light beam reaches the output port.

The method may comprise diverging the light beam as a result of the refractive index gradient.

The method may comprise collimating an input light signal into the light beam.

The method may comprise input coupling the light beam from free space, from an input fiber, or from an input waveguide.

The method may comprise collimating the light beam for focusing after the limiting.

The method may comprise output coupling to free space, to an output fiber, or to an output waveguide.

In one embodiment, a method of upper bounding information leakage in quantum cryptography is provided using the above described optical power limiter and/or using the above described method of limiting optical power.

In one embodiment, a quantum cryptography system is provided comprising the above described optical power limiter configured for upper bounding information leakage.

Embodiments of the present invention can have one or more of the following features and associated benefits/advantages.

| Feature | Benefit/Advantage |
|---|---|
| Customizable power limiting threshold | By tuning the parameters of the system, a customizable output power threshold of around mW or lower can be achieved. |
| Robust performance | The efficacy of embodiments of the present invention relies only on the temperature gradient within the optical medium, which is mainly determined by input light energy and has negligible dependence on other degrees-of-freedom. Hence, devices according to example embodiments are highly robust against environmental changes. |
| Compact and cost-effective design | Composing of only off-the-shelf optical components and having a simple structure, embodiments of the present invention possess the advantage of compact size, simple assembling, and cost-effective, etc. |

INDUSTRIAL APPLICATIONS OF EXAMPLE EMBODIMENTS

Embodiments of the present invention can, for example, be applied to the following areas:

1. Optical communication
2. Sensing
3. Quantum Cryptography

As more specific non-limiting examples, optical power limiters according to example embodiments can be used in protecting optical components in optical communication and sensing systems, limiting eavesdropper's information in quantum cryptography applications, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A quantum cryptography system including an optical power limiter comprising:
- an optical input port;
- an optical output port;
- an effective medium disposed between the input port and the output port; and
- a diaphragm disposed between the effective medium and the output port;
- wherein:
  - the effective medium has a thermo-optic coefficient such that a light beam entering the effective medium from the direction of the input port experiences a refractive index gradient in a direction perpendicular to a propagation direction in the effective medium as a result of absorption; and
  - the diaphragm is disposed in a path of the light beam for limiting how much of the light beam reaches the output port; and
  - the optical power limiter is configured for upper bounding information leakage.

2. The quantum cryptography system of claim 1, wherein the diaphragm is tunable for adjusting a limit of how much of the light beam reaches the output port.

3. The quantum cryptography system of claim 1, wherein the effective medium has a negative thermo-optic coefficient for diverging the light beam as a result of the refractive index gradient.

4. The quantum cryptography system of claim 1, wherein the input port comprises a collimator for forming the light beam from an input light signal.

5. The quantum cryptography system of claim 1, wherein the input port is configured for coupling to free space, to an input fiber, or to an input waveguide.

6. The quantum cryptography system of claim 1, wherein the output port comprises a collimator for focusing the light beam after the diaphragm.

7. A method of upper bounding information leakage in quantum cryptography using a method of limiting optical power comprising the steps of:
- directing a light beam into an effective medium disposed via an input port;
- subjecting the light beam to a refractive index gradient in the effective medium in a direction perpendicular to a propagation direction in the effective medium as a result of absorption; and
- upper bounding the information leakage by limiting how much of the light beam reaches an output port along the propagation direction.

8. The method of claim 7, comprising adjusting a limit of how much of the light beam reaches the output port.

9. The method of claim 7, comprising diverging the light beam as a result of the refractive index gradient.

10. The method of claim 7, comprising collimating and input light signal into the light beam.

11. The method of claim 7, comprising input coupling the light beam from free space, from an input fiber, or from an input waveguide.

12. The method of claim 7, comprising collimating the light beam for focusing after the limiting.

13. A method of upper bounding information leakage in quantum cryptography using an optical power limiter comprising:
- an optical input port;
- an optical output port;
- an effective medium disposed between the input port and the output port; and
- a diaphragm disposed between the effective medium and the output port;
- wherein the effective medium has a thermo-optic coefficient such that a light beam entering the effective medium from the direction of the input port experiences a refractive index gradient in a direction perpendicular to a propagation direction in the effective medium as a result of absorption; and
- wherein the diaphragm is disposed in a path of the light beam for upper bounding the information leakage by limiting how much of the light beam reaches the output port.

14. The method of claim 13, wherein the diaphragm is tunable for adjusting a limit of how much of the light beam reaches the output port.

15. The method of claim 13, wherein the effective medium has a negative thermo-optic coefficient for diverging the light beam as a result of the refractive index gradient.

16. The method of claim 13, wherein the input port comprises a collimator for forming the light beam from an input light signal.

17. The method of claim 13, wherein the input port is configured for coupling to free space, to an input fiber, or to an input waveguide.

18. The method of claim 13, wherein the output port comprises a collimator for focusing the light beam after the diaphragm.

* * * * *